(12) United States Patent
Mizunashi et al.

(10) Patent No.: US 7,640,302 B2
(45) Date of Patent: Dec. 29, 2009

(54) INFORMATION DELIVERY APPARATUS, INFORMATION DELIVERY METHOD AND PROGRAM PRODUCT THEREFOR

(75) Inventors: Suguru Mizunashi, Kanagawa (JP); Kentaro Takano, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 378 days.

(21) Appl. No.: 11/543,811

(22) Filed: Oct. 6, 2006

(65) Prior Publication Data

US 2007/0299911 A1    Dec. 27, 2007

(30) Foreign Application Priority Data

Jun. 21, 2006   (JP)   ............................ 2006-171958

(51) Int. Cl.
*G06F 15/16* (2006.01)
(52) U.S. Cl. ...................................... 709/204; 709/205
(58) Field of Classification Search ......... 709/200–207, 709/217–227
See application file for complete search history.

(56) References Cited

U.S. PATENT DOCUMENTS

| | | | |
|---|---|---|---|
| 6,446,112 B1 * | 9/2002 | Bunney et al. ............... | 709/204 |
| 6,681,247 B1 * | 1/2004 | Payton ....................... | 709/217 |
| 7,043,433 B2 * | 5/2006 | Hejna, Jr. ................... | 704/270 |
| 7,321,919 B2 * | 1/2008 | Jacobs et al. ................ | 709/205 |
| 2003/0097408 A1 * | 5/2003 | Kageyama et al. .......... | 709/205 |
| 2003/0140309 A1 * | 7/2003 | Saito et al. .................. | 715/500 |
| 2004/0260781 A1 * | 12/2004 | Shostack et al. ............ | 709/207 |
| 2007/0043817 A1 * | 2/2007 | Oliver et al. ................ | 709/206 |

FOREIGN PATENT DOCUMENTS

JP    A 2003-339033    11/2003

* cited by examiner

*Primary Examiner*—Moustafa M Meky
(74) *Attorney, Agent, or Firm*—Oliff & Berridge, PLC

(57) ABSTRACT

An information delivery apparatus includes a delivery portion that delivers conference information to a user terminal, and an interest degree calculator that calculates an interest degree of the conference information of a user, on the basis of a browsing status of the user with respect to the conference information delivered by the delivery portion. The delivery portion delivers the conference information, on the basis of the interest degree of the conference information calculated by the interest degree calculator.

12 Claims, 2 Drawing Sheets

INFORMATION DELIVERY APPARATUS, INFORMATION DELIVERY METHOD AND PROGRAM PRODUCT THEREFOR

BACKGROUND

1. Technical Field

This invention relates to an information delivery apparatus that delivers conference information, an information delivery method, and a program product therefor.

2. Related Art

There is provided a conference system which automatically acquires proceedings in a broad sense such as presentation slides, sound of a presenter and participants, and a minutes taken by a minutes creator in real time during a conference. Such acquired proceedings are accumulated together with meta information such as time, place, speaker, and the like. A user browses the accumulated information by downloading the information to his/her mobile phone, a portable terminal such as Personal Digital Assistants (PDA), or a personal computer. Thereby, the user can comprehend a summary of the conference.

SUMMARY

An aspect of the present invention provides an information delivery apparatus including: a delivery portion that delivers conference information to a user terminal; and an interest degree calculator that calculates an interest degree of the conference information of a user, on the basis of a browsing status of the user with respect to the conference information delivered by the delivery portion, wherein the delivery portion delivers the conference information, on the basis of the interest degree of the conference information calculated by the interest degree calculator.

DETAILED DESCRIPTION

Figure 1:
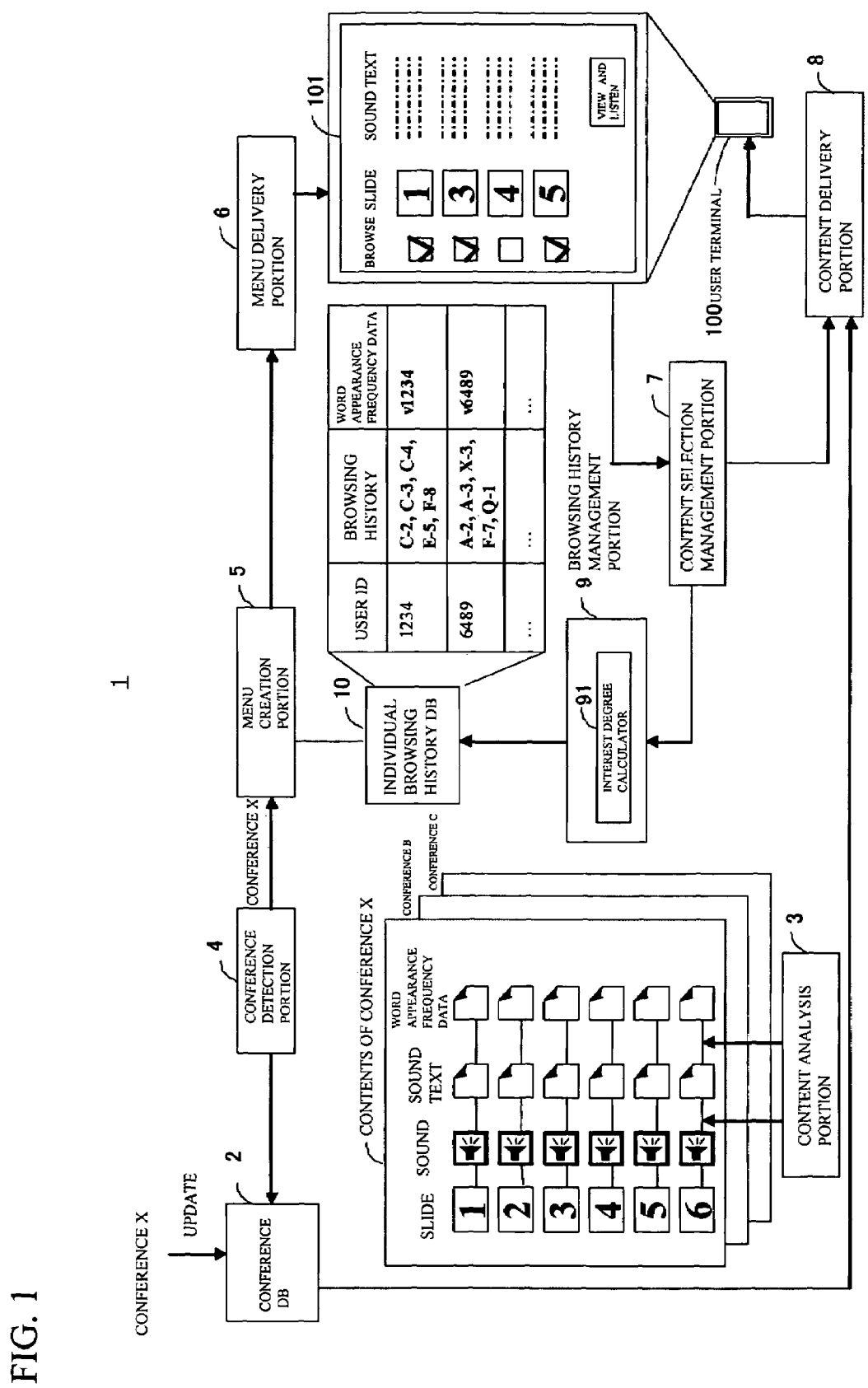
FIG. 1 is an overall structural diagram of an information delivery apparatus in accordance with an aspect of the invention.

A description will now be given of exemplary embodiments employed in the present invention. FIG. 1 is an overall structural diagram of an information delivery apparatus in accordance with an aspect of the invention. Referring to FIG. 1, an information delivery apparatus 1 includes a conference database (DB) 2, a content analysis portion 3, a conference detection portion 4, a menu creation portion 5, a menu delivery portion 6, a content selection management portion 7, a content delivery portion 8, a browsing history management portion 9, and an individual browsing history DB 10. The browsing history management portion 9 has an interest degree calculator 91. The reference numeral 100 represents a user terminal owned by a user. The reference numeral 101 represents a display on the user terminal 100. The user terminal 100 is composed of, for example, a portable terminal, a personal computer, or a mobile phone.

The information delivery apparatus 1 is composed of a Central Processing Unit (CPU), a Random Access Memory (RAM), a Read Only Memory (ROM), a hard disk, and the like. The CPU executes a given program, and thereby each function shown in FIG. 1 is performed. It is possible to use multiple CPUs or the like according to a content to be processed and a processing speed.

The conference DB 2 accumulates slides used in a conference, sound data produced by a presenter, text data as a result of sound recognition, information of a word extracted from a sound text, appearance frequency data of the word and the like for every conference. Also, data obtained by capturing a conference X with a camcorder may be accumulated in the conference DB 2.

The content analysis portion 3 analyzes conference contents of respective conferences B, C, and X. In FIG. 1, A represents contents of the conference X. It is assumed that six pieces of slides are used in the conference X. The content analysis portion 3 segments sound data in accordance with a change of each slide based on the sound data produced by a presenter captured in the conference, performs sound recognition to create text data, calculates an appearance frequency of a word included in the sound data based on the text data, and creates word appearance frequency data. The content analysis portion 3 may extract a word from a text included in a slide to create the word appearance frequency data of the above-described word from the text included in the slide and a text created from the sound data. Then, the content analysis portion 3 stores the calculated word appearance frequency data in the conference DB 2 in association with the slide data and the sound data. The conference detection portion 4 detects that the conference DB 2 is updated by the conference data.

The individual browsing history DB 10 accumulates individual browsing histories for every user. In an example shown in FIG. 1, a user with a user ID "1234" has browsed slides of slide number 2 of the conference C (C-2), slide number 3 of the conference C (C-3), slide number 4 of the conference C (C-4), slide number 5 of the conference E (E-5), and slide number 8 of the conference F (F-8). For the user having the user ID "1234", word appearance frequency data (v1234) is produced as an interest degree of conference information. A user with a user ID "6489" has browsed slides of slide number 2 of the conference A (A-2), slide number 3 of the conference A (A-3), slide number 3 of the conference X (X-3), slide number 7 of the conference F (F-7), and slide number 1 of the conference Q (Q-1). For the user having the user ID "6489", word appearance frequency data (v6489) is produced as an interest degree of the conference information. The appearance frequency data of each word is represented by a vector.

The menu creation portion 5 and the menu delivery portion 6 work together to deliver the conference information to the user terminal 100 based on the interest degree of the conference information. The menu creation portion 5 creates a delivery menu to be delivered based on word appearance frequency data as the interest degree of the conference information of a user. The delivery menu is sent before delivery of the conference information. On the delivery menu, the conference information can be selected on a slide basis.

Specifically, the menu creation portion 5 refers to the word appearance frequency data of a browsing history of each user in the individual browsing history DB 10 and newly updated word appearance frequency data for every slide of the conference X, and selects appropriate slides for each user. Then, the menu creation portion 5 creates a menu composed of the slides selected for each user. The menu delivery portion 6 delivers the menu created by the menu creation portion 5. In accordance with data created by the menu creation portion 5, the menu delivery portion 6 delivers the slides used in the conference, the sound data produced in the conference, or character information created based on the sound data produced in the conference, to the user terminal 100, as the conference information. Here, the menu delivery portion 6 delivers the conference information on a slide basis. The description is given by using the word appearance frequency as an interest degree of conference information of a user. However, the present invention is not limited to the word appearance frequency, if it is possible to represent the user's interest degree in the conference information.

On the display 101 of the user terminal 100, there are partially displayed checkboxes for browsing, thumbnails of slides, and sound texts. A user views the thumbnails and the sound texts. When there is a slide that the user likes to browse, the user operates the user terminal 100 to check the checkbox. In the example of FIG. 1, the checkboxes of slides 1, 3, and are checked by the user. Then, the user terminal 100 sends browsing status data that includes at least one of a selection result by a delivery menu of the conference information to be delivered to a user and a browsing history of the conference information for each user to the content selection management portion 7.

The content selection management portion 7 acquires browsing status data of a user from the user terminal 100. The content selection management portion 7 detects that each user selects a slide that the user likes to view from a presented menu and presses an audiovisual button based on the checkbox for browsing. The content delivery portion 8 delivers the selected slide and the sound data corresponding thereto from the conference DB 2. The browsing history management portion 9 manages the interest degrees of the conference information for every user. The interest degree calculator 91 calculates the user's interest degree of the conference information based on a browsing status of the conference information delivered by the menu delivery portion 6. Here, as described above, the word appearance frequency data is used as the user's interest degree of the conference information.

The interest degree calculator 91 calculates the word appearance frequency data of each user as the user's interest degree of the conference information based on the word appearance frequency data of each slide. The browsing history management portion 9 accumulates information of a slide selected by each user as a browsing history in the individual browsing history DB 10, and updates the interest degree of the conference information, that is, the word appearance frequency data.

Figure 2:
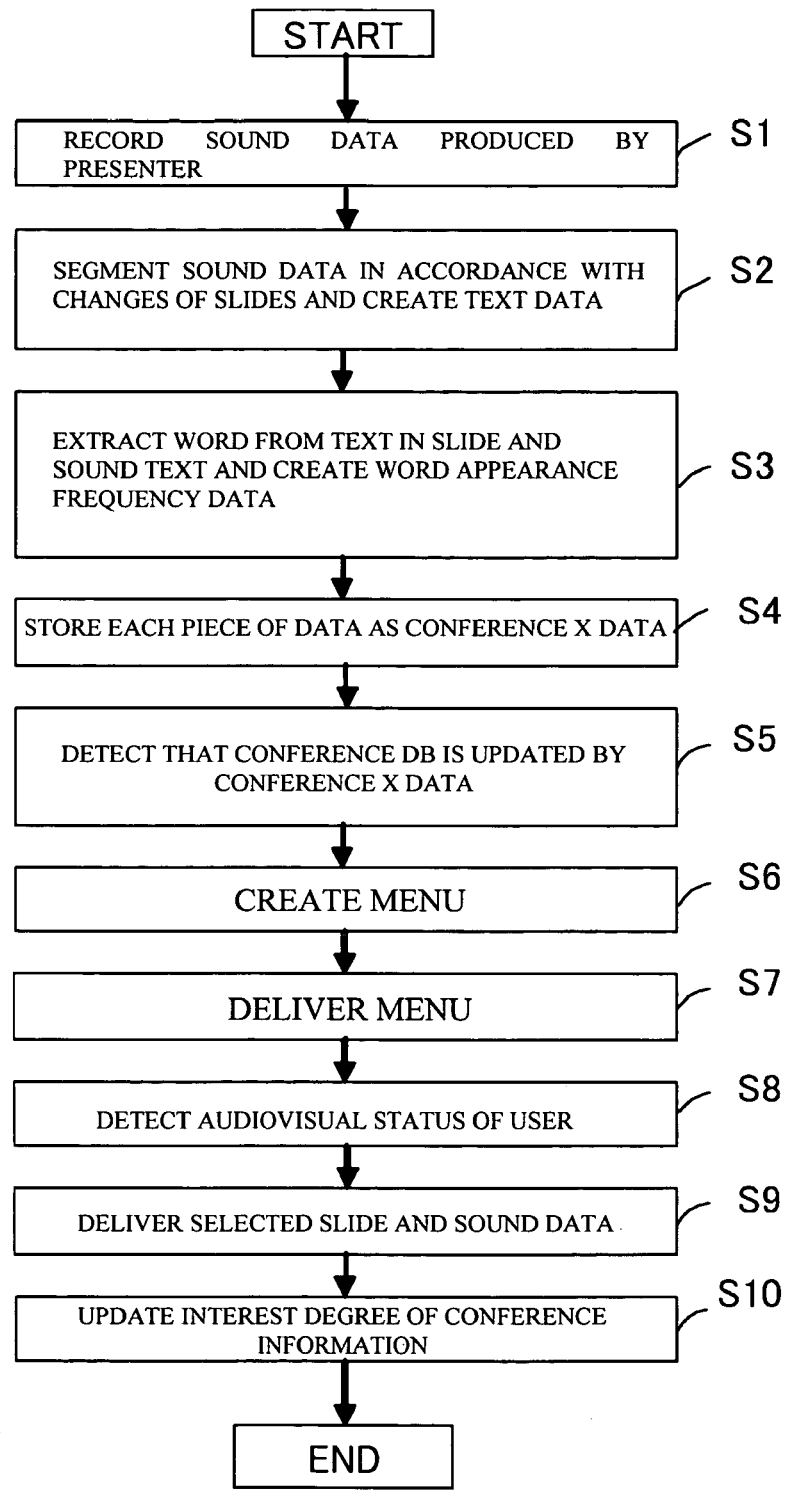
FIG. 2 is an operation flowchart of an information delivery system in accordance with an aspect of the invention.

Next, a description will be given of the operation of an information delivery system. FIG. 2 is an operation flowchart of the information delivery system in accordance with an aspect of the invention. The conference X is captured by a microphone set in a conference room.

The conference X is held, and slides used there and sound data produced by a presenter are recorded in the conference DB 2 (step S1). The content analysis portion 3 segments the sound data in accordance with changes of the slides, and performs sound recognition to create text data (step S2). The content analysis portion 3 extracts a word from a text in a slide and a sound text, and creates word appearance frequency data (step 3). Then, the content analysis portion 3 stores the foregoing data in the conference DB 2 as conference X data (step S4).

Next, the conference detection portion 4 detects that the conference DB 2 is updated by the conference X data (step S5). The menu creation portion 5 refers to the word appearance frequency data of a browsing history of each user in the individual browsing history DB 10 and the word appearance frequency data for every slide of the conference X, and selects an appropriate slide for each user. Then, the menu creation portion 5 creates a menu composed of the slides selected for each user (step S6). The menu delivery portion 6 delivers the menu created by the menu creation portion 5 (step S7). At this time, the menu delivery portion 6 delivers a Uniform Resource Locator (URL) by e-mail. Here, on the created menu, the slides that have been determined appropriate in step S6 are highlighted. While viewing the display 101 of the user terminal 100, a user checks the checkbox of a slide that the user likes to browse. This allows the user terminal 100 to access the URL.

The content selection management portion 7 detects that each user has selected the slide that the user likes to view from a presented menu and has pressed the audiovisual button as a user's audiovisual status (step S8). The content delivery portion 8 delivers the selected slide and sound data corresponding thereto (step S9). The user downloads slide data and the sound data with the use of the user terminal 100, and views and listens to the downloaded data on the user terminal 100. The browsing history management portion 9 accumulates information of the slides selected by each user in the individual browsing history DB 10 as a browsing history, and thus the word appearance frequency data is updated (step S10). Subsequently, the menu creation portion 5 selects the slide to be included in a menu based on the user's word appearance frequency data that has been updated.

As described heretofore, the data in the conference DB 2 includes only the contents of the conference. However, the data in the conference DB 2 may include meta information such as date and hour, place, participant, and presenter of the conference. It is also possible to add a function to deliver the slide, on a priority basis, on which a specific speaker makes a statement, by setting, for example, a preference item in the individual browsing history DB 10 and setting preferences of a speaker or the like.

It is possible that how much a specific slide is browsed is rated based on the whole of individual browsing histories. This can produce a mechanism in which popular contents are preferentially delivered when contents are delivered to each individual or unpopular contents that have not been browsed in a certain period can be deleted from the conference DB 2. In addition, when the word appearance frequency data of each slide of each conference is not previously calculated by the content analysis portion 3, the interest degree calculator 91 may calculate the word appearance frequency based on the sound data produced in a conference, and may calculate the user's interest degree of the conference information based on such calculated word appearance frequency.

The information delivery method in accordance with an aspect of the invention is implemented on the information delivery apparatus 1. Each function shown in FIG. 1 is performed by executing a given program on CPU.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information delivery apparatus comprising:
   a delivery portion that delivers conference information to a user terminal;
   an interest degree calculator that calculates an interest degree of the conference information of a user and calculates a word appearance frequency on a basis of sound data produced in a conference, wherein the interest degree of the conference information of the user is calculated on a basis of a browsing status of the user with respect to the conference information delivered by the delivery portion and on the basis of the word appearance frequency calculated, and wherein the delivery portion delivers the conference information, on the basis of the interest degree of the conference information of the user calculated by the interest degree calculator.

2. The information delivery apparatus according to claim 1, further comprising a management portion that manages the interest degree of the conference information for every user of a plurality of users.

3. The information delivery apparatus according to claim 1, wherein the delivery portion delivers a menu of the conference information to the user terminal.

4. The information delivery apparatus according to claim 1, wherein the delivery portion delivers the conference information on a slide basis used in a conference to the user terminal.

5. The information delivery apparatus according to claim 1, wherein the delivery portion delivers the sound data produced in a conference to the user terminal, as the conference information.

6. The information delivery apparatus according to claim 1, wherein the delivery portion delivers character information created on the basis of sound data produced in a conference to the user terminal, as the conference information.

7. The information delivery apparatus according to claim 1, wherein the browsing status of the user includes at least one of a selection result by a delivery menu of the conference information delivered to the user and a browsing history of the conference information for every user of a plurality of users.

8. The information delivery apparatus according to claim 1, wherein a delivery menu is sent before a delivery of the conference information, and the conference information can be selected on the delivery menu on a slide basis.

9. The information delivery apparatus according to claim 1, wherein the word appearance frequency is used solely as the interest degree of the conference information of the user.

10. The information delivery apparatus according to claim 1, further comprising:

a content analysis portion that calculates an appearance frequency of a word included in sound data on the basis of the sound data captured in a conference; and a storage section that stores the word appearance frequency data calculated in association with the sound data, wherein the interest degree calculator calculates the interest degree of the conference information of the user on the basis of the word appearance frequency stored in the storage section.

11. An information delivery method comprising:

delivering conference information to a user terminal;

calculating an appearance frequency of a word included in sound data on a basis of sound data captured in a conference;

storing word appearance frequency data calculated in association with the sound data, calculating an interest degree of the conference information of a user on a basis of a browsing status of the user with respect to the conference information delivered and on the basis of the stored word appearance frequency data; and delivering the conference information on the basis of the interest degree calculated with respect to the conference information.

12. A computer readable medium storing a program causing a computer to execute a process for information delivery, the process comprising:

delivering conference information to a user terminal;

calculating an appearance frequency of a word included in sound data on a basis of sound data captured in a conference;

storing word appearance frequency data calculated in association with the sound data, calculating an interest degree of the conference information of a user on a basis of a browsing status of the user with respect to the conference information delivered and on the basis of the stored word appearance frequency; and delivering the conference information on the basis of the interest degree calculated with respect to the conference information.

* * * * *